United States Patent [19]
Cohen et al.

[11] Patent Number: 6,100,861
[45] Date of Patent: *Aug. 8, 2000

[54] TILED FLAT PANEL DISPLAY WITH IMPROVED COLOR GAMUT

[75] Inventors: Jennifer Cohen, Harrisburg, Pa.; Raymond G. Greene, Ovid; Dean W. Skinner, Vestal, both of N.Y.

[73] Assignee: Rainbow Displays, Inc., Endicott, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/024,487

[22] Filed: Feb. 17, 1998

[51] Int. Cl.[7] .......................... G09G 3/36; G02F 1/1335
[52] U.S. Cl. ........................................ 345/88; 349/109
[58] Field of Search .................... 345/48, 51, 63, 345/72, 76, 77, 83, 87, 88, 89; 349/78–83, 106–109

[56] References Cited

U.S. PATENT DOCUMENTS

| | | | |
|---|---|---|---|
| 5,311,337 | 5/1994 | McCartney, Jr. | 349/145 |
| 5,341,153 | 8/1994 | Benzschawel et al. | 345/152 |
| 5,461,503 | 10/1995 | Deffontaines et al. | 349/109 |
| 5,587,819 | 12/1996 | Sunohara et al. | 349/106 |
| 5,661,531 | 8/1997 | Greene et al. | 349/73 |

*Primary Examiner*—Mark R. Powell
*Assistant Examiner*—Thu Nguyen
*Attorney, Agent, or Firm*—Salzman & Levy

[57] ABSTRACT

Pixel layout and placement designs provide improved color gamut in a tiled flat-panel display. The subpixels of the pixel designs are sized, placed and geometrically shaped so that the color purity, or equal amounts of RGB, are emitted from the display. The pixel designs match the subpixel size with the color filter and spectral content of the illumination source. The layout and placement design of the color pixel elements does not significantly shift the color purity of each pixel of the tile that may be in plane misalignment with respect to aperture masks above and below the tiles in the display configurations.

18 Claims, 6 Drawing Sheets

6,100,861

TILED FLAT PANEL DISPLAY WITH IMPROVED COLOR GAMUT

FIELD OF THE INVENTION

The present invention pertains to flat-panel displays with improved color gamut and, more particularly, to a tiled, seamless, liquid crystal, flat-panel display with an improved color gamut and color purity, and a method of fabricating it.

RELATED PATENT APPLICATION

In copending U.S. patent application, Ser. No. 08/652,032, filed May 21, 1996, entitled "Construction and Sealing of Tiled, Flat-Panel Displays", a flat-panel display is shown wherein the tiles are constructed to provide a display that does not show the usual seams between the tiles. The teachings of this patent application are hereby incorporated by reference.

BACKGROUND OF THE INVENTION

A pixel in an LCD display customarily comprises an aperture opening containing equally sized sub-pixels of red, green and blue (RGB). The most common light source used on liquid crystal displays (LCDs) is a fluorescent lamp with associated diffuser. The most efficient fluorescent lamps are comparatively strong in green and weak in blue content, by design necessity. One method of color correction is to color balance the display by allowing less green to be transmitted. Electronics are used to partially energize (turn off) the green in the white state, in order to increase the quality of the gamut, but at the cost of overall brightness. Additionally, in a tiled display with a backplate containing a mask, the outer sub-pixels are illuminated less than is the center subpixel. This is so because the mask blocks some of the light near the edge of the pixel aperture, making the display appear green, when it should appear white (i.e., when near equal amounts of red, green and blue are used to fabricate the tiles).

Flat-panel displays made in accordance with known liquid crystal display technologies are limited in size, and are expensive to manufacture. Inexpensive, larger displays can be made from assembling smaller display tiles, but often result in visible seams between the tiles. It has always been a major problem concealing the tile seams so that the assembled, large display has the appearance of a continuous, seamless one-piece unit.

One method of making tiled displays is to connect four tiles together at common locus lines, using an adhesive sealant along the adjacent seams. The tiles are assembled in an in-plane fashion. This type of construction is shown in the aforementioned, previously filed U.S. patent application, Ser. No. 08/652,032. The method of construction consists of assembling LCD tiles in a planar fashion, by locating the appropriate fiducials disposed on each tile. The tiles are attached to the cover plate and backplate with a refractive, index-matched adhesive. Prior to assembly, the adjacent tile edges are finished so that their final position in the assembly provides a seamless appearance. In addition, the cover plate and backplate contains opaque masks used to hide the seams. The back mask also serves as a light collimator.

The current invention provides a method of fabricating the flat-panel, LCD display of the aforementioned invention so that it has a superior color gamut and light efficiency.

SUMMARY OF THE INVENTION

In accordance with the present invention, there is provided a tiled, seamless, flat-panel, LCD display having optimum color gamut and improved color purity. Pixel designs are provided in which the sub-pixels are sized, placed and geometrically shaped so that the desired color purity, or equivalent amounts of red, green and blue are emitted from the display. The pixel designs match the sub-pixel size with the color filter and spectral content of the illumination source. The display comprises tiles that are bonded together between continuous polarizers during assembly with an index-matching adhesive, as taught in the aforementioned U.S. patent application. The display also comprises a cover plate having an aperture mask and screen and a backplate containing an aperture mask. The placement of the color sub-pixels is chosen in order to maximize the color gamut and the intensity of white light emission from the display. In addition, the sub-pixels are sized so that the color purity, or equivalent amounts of RGB, are emitted from the display.

It is one of the objects of this invention to provide a tiled, flat-panel, seamless display that has an optimum color gamut.

It is another object of the invention to provide pixel designs for improved color gamut for both tiled and monolithic, flat-panel displays.

It is a further object of this invention to optimize the design of the pixel geometry in correlation with the color filters used in the LCD, and the spectral content of the illumination source, in order to maximize the efficiency of the display, while optimizing the color gamut.

It is yet another object of the invention to provide a number of pixel designs for improving color purity of seamless, tiled, flat-panel displays.

BRIEF DESCRIPTION OF THE DRAWINGS

A complete understanding of the present invention may be obtained by reference to the accompanying drawings, when considered in conjunction with the subsequent detailed description, in which:

FIG. 1b depicts a schematic plan view of the prior art flat-panel display in accordance with FIG. 1a;

FIG. 2b shows a graphical comparison of the spectral content of light entering and exiting the prior art flat-panel display shown in FIGS. 1a and 1b, versus that of the pixel construction shown in FIG. 2a;

For purposes of both clarity and brevity, like elements and components will bear the same designations and numbering throughout the FIGURES.

DESCRIPTION OF THE PREFERRED EMBODIMENT

Generally speaking, the invention features several embodiments of pixel design constructions for flat panel displays. The purpose of such constructions is to improve the color gamut and color purity of a seamless, LCD display. Pixel designs are provided in which the sub-pixels placed, sized and geometrically shaped so that the color purity, or equivalent amounts of RGB, are emitted from the display. The pixel designs match the sub-pixel size with the color filter and spectral content of the illumination source. The geometric design of the color pixel elements does not significantly shift the color purity of each pixel of the tile even though the pixel may be in plane misalignment with respect to aperture masks that are above and below the tiles in the display configurations described herein. Such pixel designs include pixel layouts with two of the primary colors being rectangle shaped, and bounded on each side with smaller rectangle shaped elements of the third primary color.

Figure 1A:
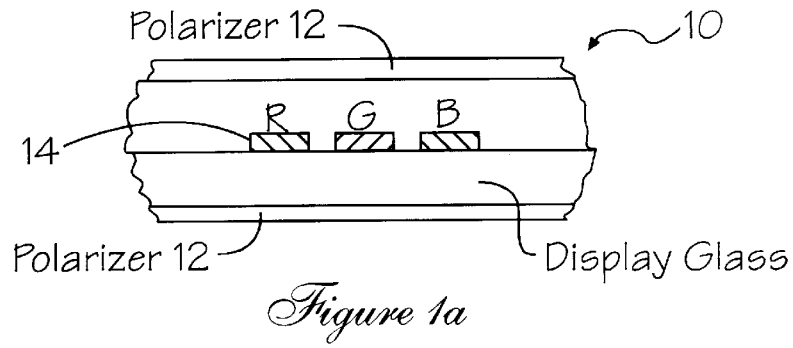
FIG. 1a illustrates a schematic sectional view of a flat-panel display constructed in accordance with techniques of the prior art.

Now referring to FIG. 1a, a sectional view of a color pixel in a prior art, LCD display 10 is shown. The display 10 consists of an LCD cell with external polarizers 12 and color filters RGB 14 in the active area of the window representing a pixel 16.

Figure 1B:
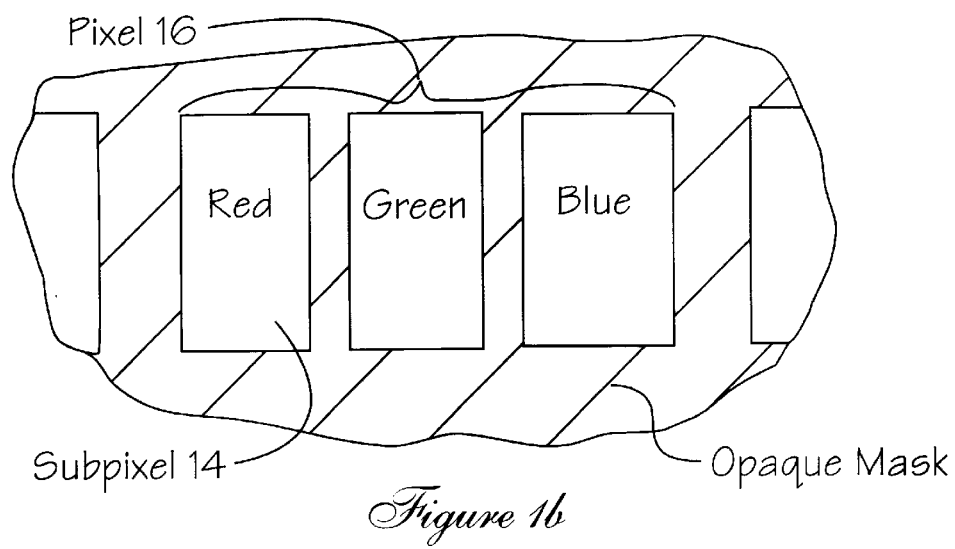

Referring now also to FIG. 1b, the plan view of the display 10 of FIG. 1a is shown. Color sub-pixels 14 are operated independently. The color filters are typically made to be red, green and blue, or RGB. FIG. 1b also shows the planar layout of the pixel 16 in the display 10 with light-emitting sub-pixel apertures 14 of equal size. No light is passed by the opaque mask 15 (light-controlling function).

Figure 1C:
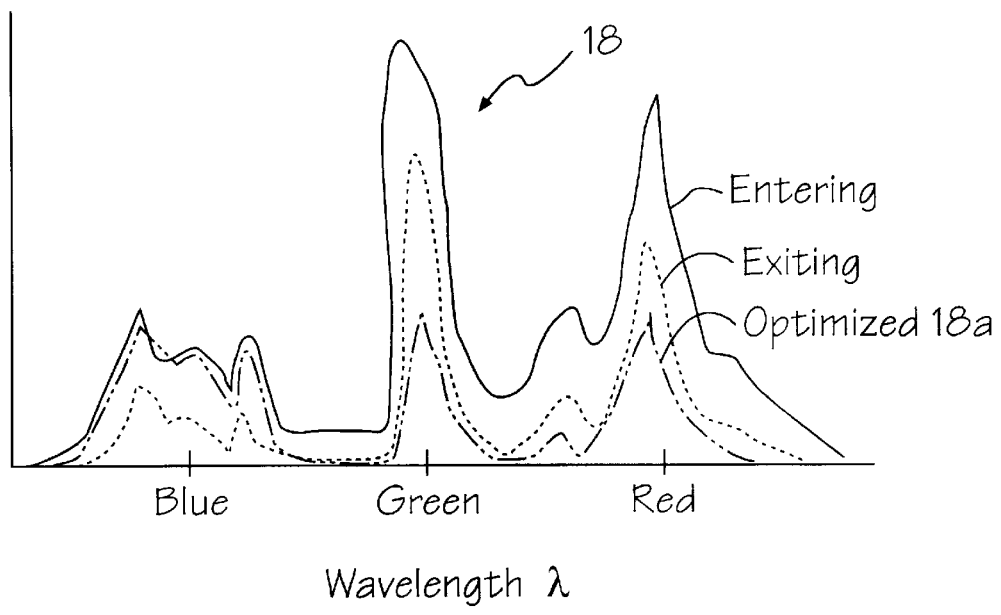
FIG. 1c shows a graphical view of the spectral content of light entering and exiting the prior art flat-panel display shown in FIGS. 1a and 1b.

Referring now also to FIG. 1c, a typical visible light spectrum 18 is illustrated, using typical fluorescent illumination for the LCD display 10 of FIGS. 1a and 1b. The spectrum 18 is altered as light passes through the display and is affected by the polarizers, color filters and other layers of the LCD structure. The ideal spectrum 18a of light to exit the display is one in which the three primary colors of RGB are balanced, having the same intensity. Ideally, the illumination source should be designed in conjunction with the color filters and other components of the display to produce the correct spectral output. This, however, as a practical matter, can only be approximated, in most cases.

Figure 2A:
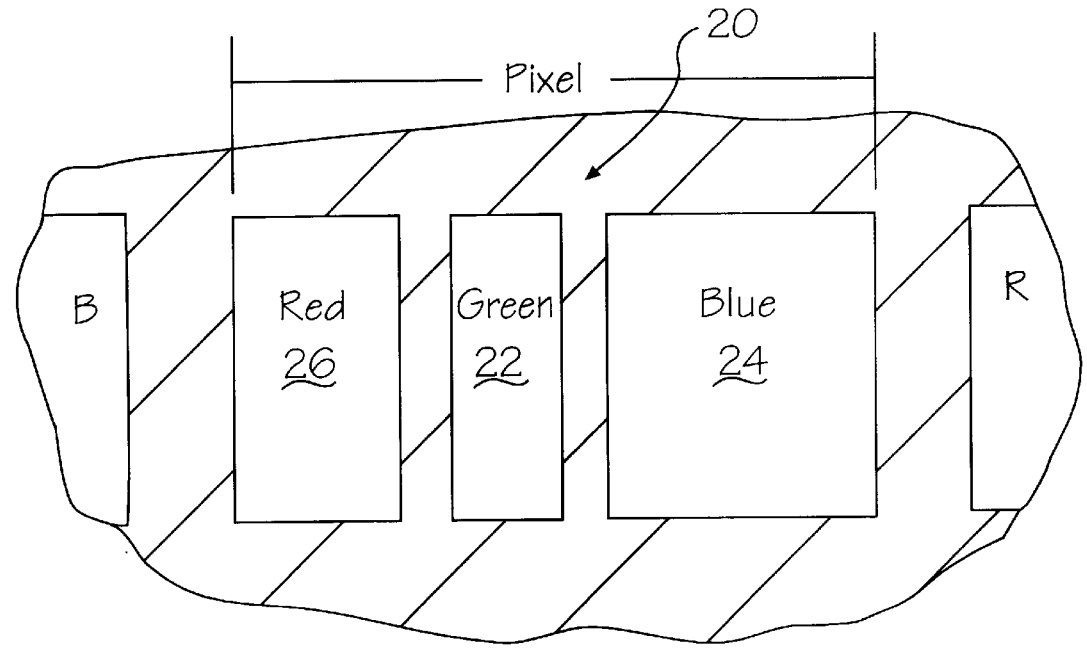
FIG. 2a depicts a plan view of a pixel layout and placement for optimum color gamut in a flat-panel LCD display, in accordance with this invention.
Figure 2B:
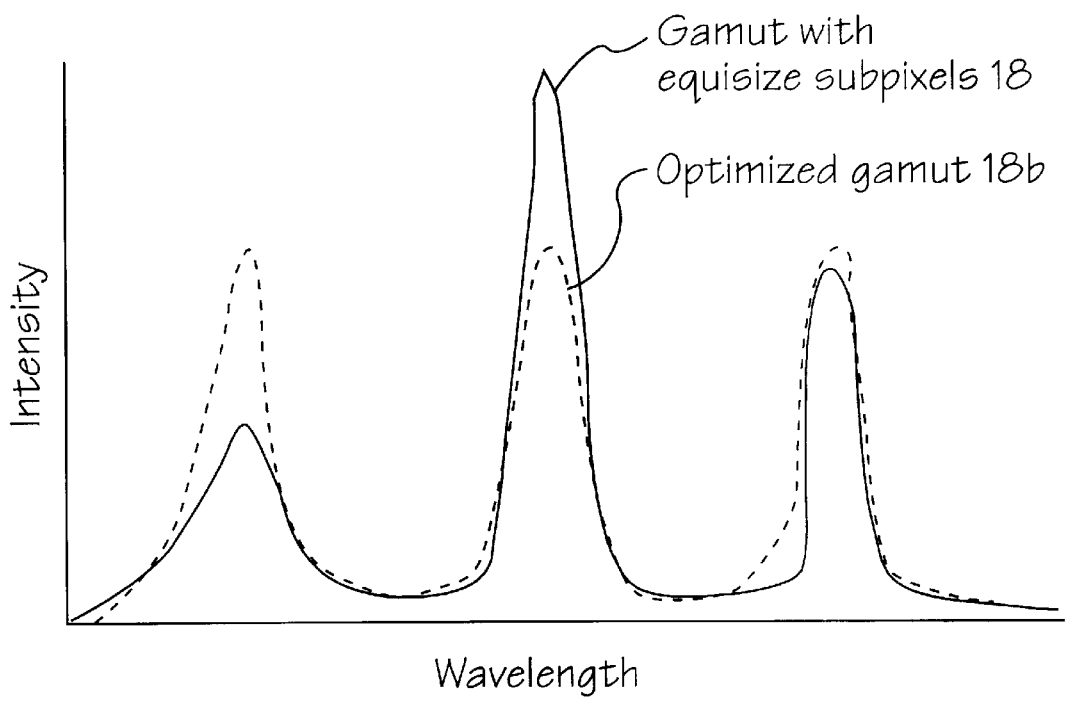

Now referring to FIG. 2a, the pixel layout and placement geometry 20 is changed in accordance with the teaching of this invention. Sub-pixel sizes are designed to adjust the spectral output of the display to that of the desired, ideal visible spectrum. The green sub-pixel 22 has been reduced in size; the areas of the blue sub-pixel 24 and the area of the red sub-pixel 26 have been adjusted, to ensure the desired spectral properties. The resulting intensity is essentially the same for each, as shown for the resulting spectrum 18b, illustrated in FIG. 2b.

Figure 3A:
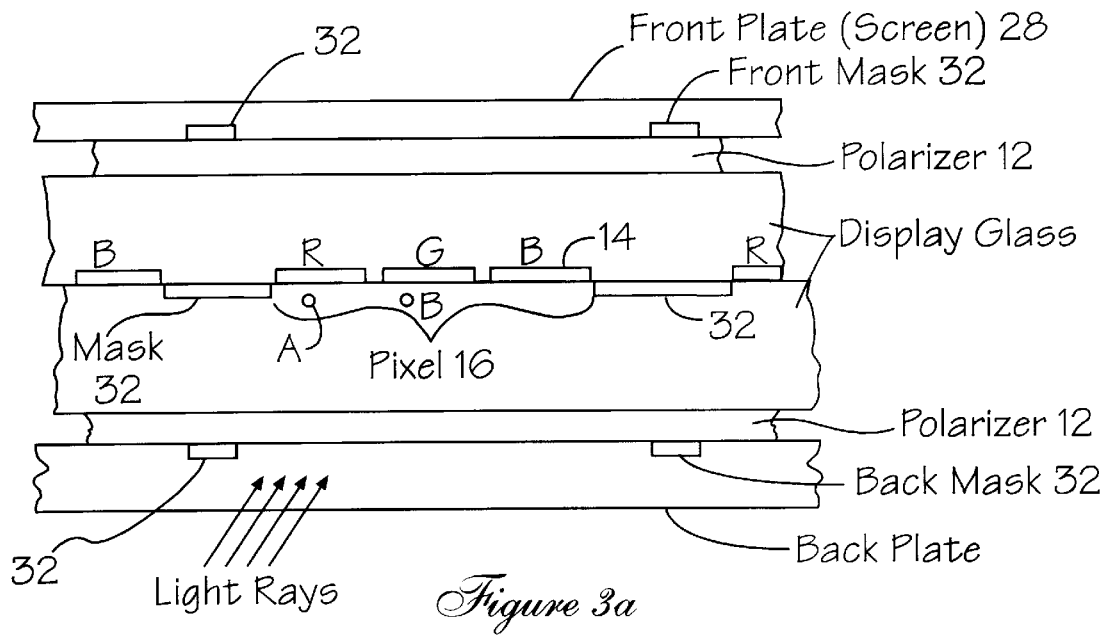
FIG. 3a illustrates a sectional view of a pixel in a tiled display.

Now referring to FIG. 3a, the sectional view of the prior art construction of the tiled, flat-panel, LCD display 10 (FIG. 1a) is shown with masking. The LCD tiles are bonded together in a plane along the seams and also bonded to a cover plate 28 and backplate 30 by a thin, adhesive film (not shown) possessing the same index of refraction as do the tiles.

The cover plate 28 and backplate 30 contain opaque masks 32 used to hide the seams between tiles, making the display appear seamless or monolithic in appearance, as described in the aforementioned United States patent application. The construction taught therein conceals the seams between the tiles by using collimated light, along with masks on both sides of the assembly. The collimated light requires a diffusion screen coating on the viewing side of the display, in order to recapture the viewing angle lost in collimation. The light-controlling function is now provided by the combined action of the mask located on the display glass, the front mask, and the back mask.

Figure 3B:
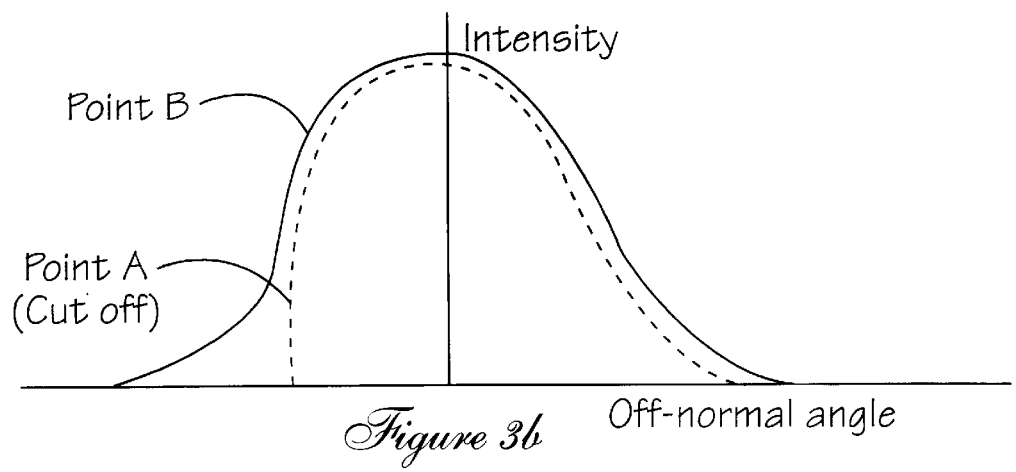
FIG. 3b depicts a graphical view of an illumination source intensity curve as a function of off-normal angle of incidence.
Figure 3C:
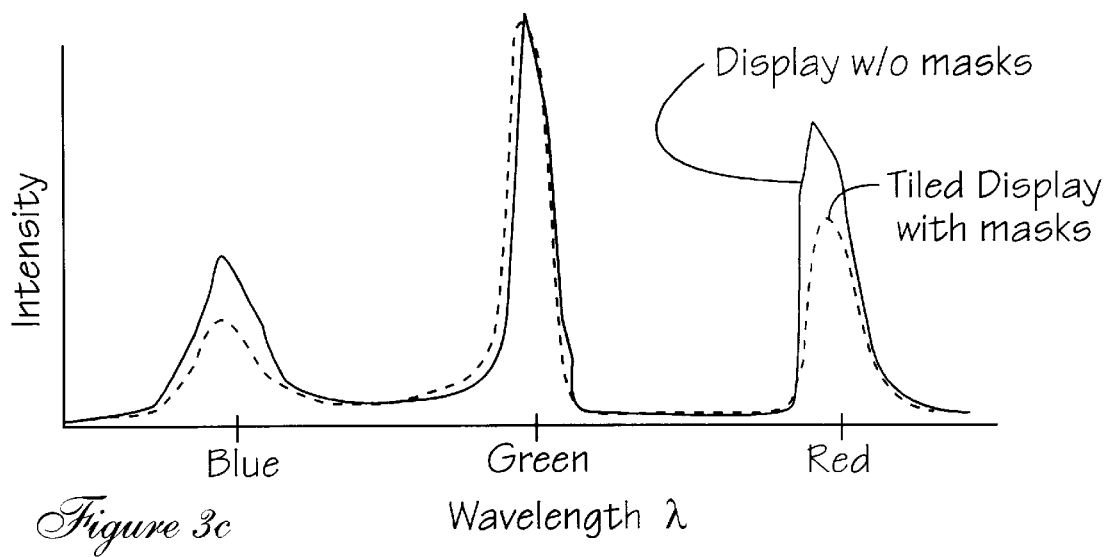
FIG. 3c illustrates a graphical view of the spectral content of light entering and exiting a typical tiled, flat-panel, LCD display, and a tiled display with masked construction.

Now referring to FIG. 3b, the collimated light entering the display is shown as a function of off-normal angle. The central portion of the pixel, point "B" in the FIGURE, is illuminated with this collimated light. The edge of the pixel, point "A" in the FIGURE, suffers from loss of light intensity due to a cutoff caused by the backplate mask 32, as shown in FIG. 3b. Thus, the green intensity becomes even more predominant than it would in a non-tiled display 10. This effect is shown in FIG. 3c, where the green intensity is unaffected by the masks 32, but the red and blue suffer loss in intensity.

Figure 4A:
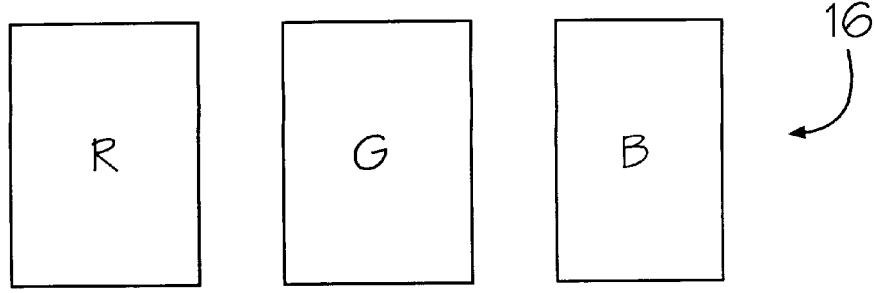
FIGS. 4a through 4d illustrate plan views of sub-pixel designs which optimize the color gamut for a particular filter set, illumination source, mask and collimation profile.
Figure 4B:
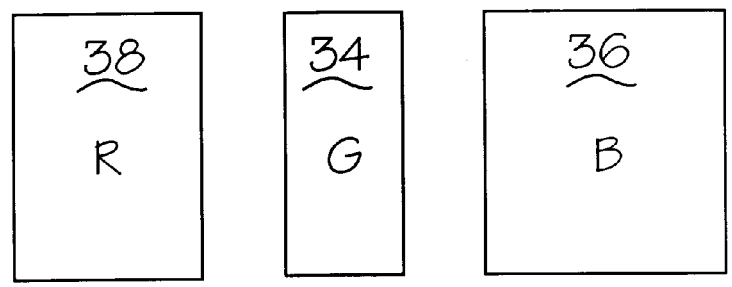

FIGS. 4a through 4d depict different pixel layout, placement and design sizes that demonstrate the balance of the color spectrum. FIG. 4a is used as a reference for the standard, prior art design of LCD pixels 16. FIG. 4b illustrates a pixel design that is corrected for the optimum color balance, and therefore provides a greater color gamut. Notice that the green sub-pixel area 34 is reduced and the blue area 36 is increased. The red area 38 is chosen to balance them. The design in FIG. 4b is essentially the same as that shown in FIG. 2.

Figure 4C:
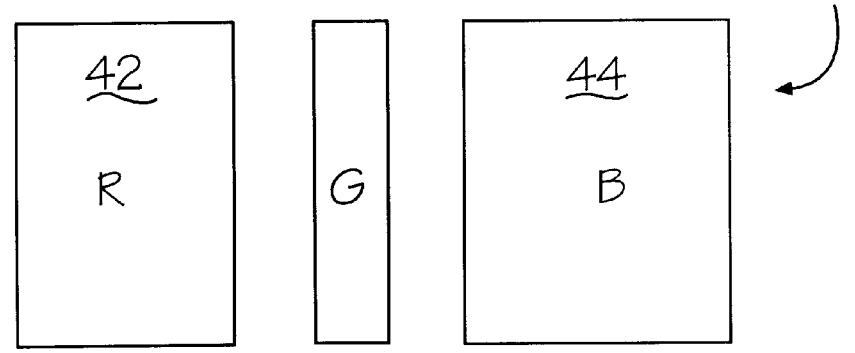

Referring to FIG. 4c, a pixel layout and placement design 40 for a tiled display is shown. The outer two colors, red 42 and blue 44, require more correction in order to overcome the loss of intensity suffered from the masks.

Figure 4D:
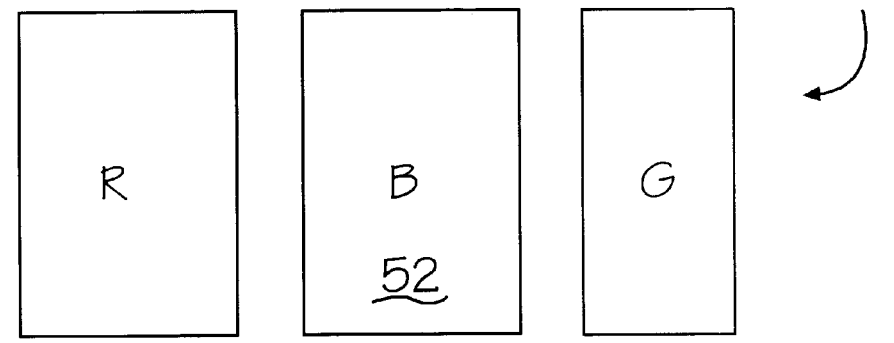

FIG. 4d shows an alternate embodiment 50 of the pixel layout and placement design in FIG. 4c. The center pixel 52 is now blue, since it is the weakest color emitted by the light source. These designs (FIGS. 4b, 4c, 4d) correct for the color imbalance of the three primary colors. Additional designs can be provided for other purposes, or to match specific light sources and filters.

Tolerances associated with locating tiles relative to each other, accompanied with the use of masks, collimated light, and diffusing projection screens for tiled, flat-panel displays, can sometimes cause color shifts between tiles. This invention describes pixel layout and placement designs that eliminate the color shifts arising from tile-to-mask registration errors.

Figures 5A, 5B:
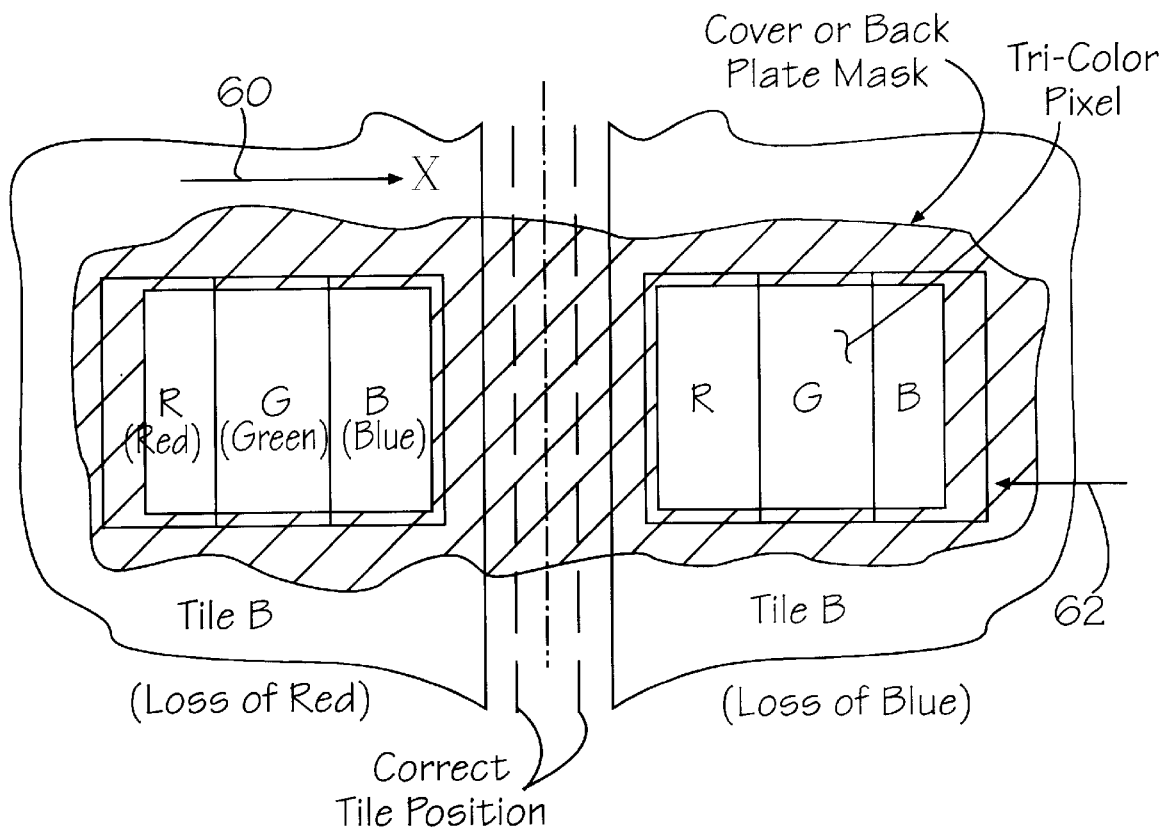
FIG. 5a depicts a plan view of a pixel misregistered with respect to the cover plate mask resulting in loss of red color.
FIG. 5b depicts a plan view of a pixel misregistered with respect to the cover plate mask resulting in loss of blue color.

Referring to FIG. 5a, there is shown the relative horizontal misregistration between a tri-color pixel 16 and a corresponding mask 32. Pixels for color displays are typically constructed from the three primary additive colors of red, blue and green, and are referred to as RGB pixels, as aforementioned. The color shift of the tile occurs when some of the light is blocked in the "X" direction, as shown by arrow 60. In FIG. 5a, some of the red is blocked, reducing the red intensity, and giving a blue tint to the tile color.

Referring to FIG. 5b, the horizontal misregistration occurs in the opposite "X" direction (arrow 62). The blue intensity is reduced, and the tile has a red tint. Therefore, adjacent tiles can have distinctly different color tints due to assembly tolerance differences. Misalignment occurring in the vertical direction along the RGB stripes only decreases the light intensity, since the three colors combine to form white, and are each reduced by the same amount.

Figure 5C:
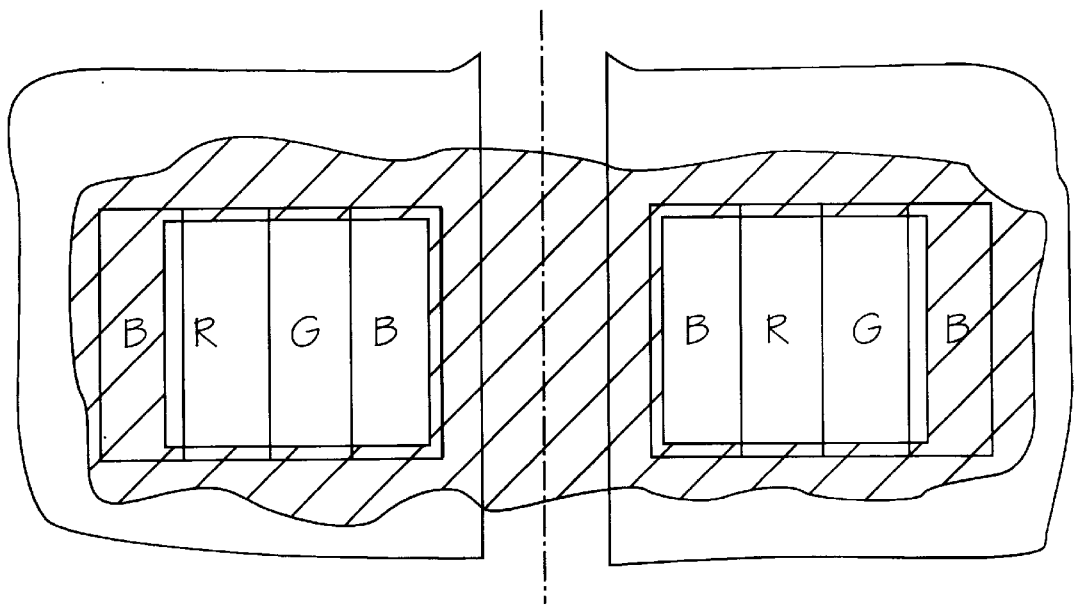
FIGS. 5c through 5f depict plan views of different embodiments of pixel layout and placement geometries that provide improved color purity for tiled, flat-panel displays, which use masks and collimated light to conceal the seams.

FIG. 5c shows a pixel design that is the preferred embodiment of this invention. The pixel color layout and placement is symmetric about the vertical centerline of the pixel. When a horizontal misregistration occurs between the pixel and a mask, the blue intensity is reduced on one side and increased on the opposite side, thereby maintaining the color purity of the tile. In other words, the exposure of light through the mask always illuminates the same area of blue in the pixel. In practice, for manufacturing reasons, the mask opening is larger than the pixel and the collimated light is somewhat divergent. However, color purity can still be maintained with this invention.

Figure 5D:
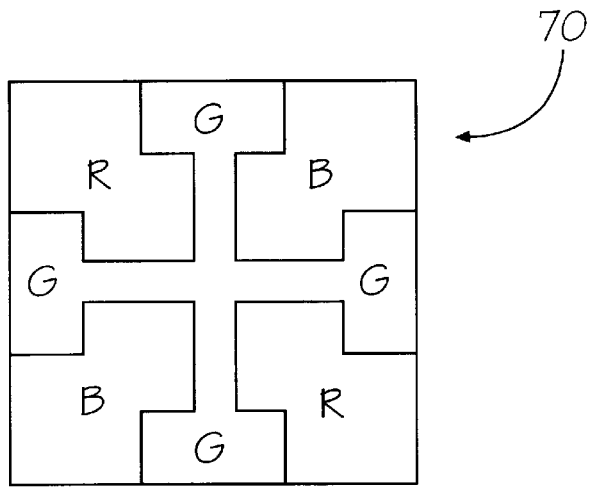

Referring to FIG. 5d, an example of an ideal pixel layout design 70 is illustrated. This pixel design maintains the tile color purity in a unique manner. Should a misregistration occur in any direction, no color change will be evident. The light intensity decreases somewhat with misregistration, but the color is always pure white.

Figure 5E:
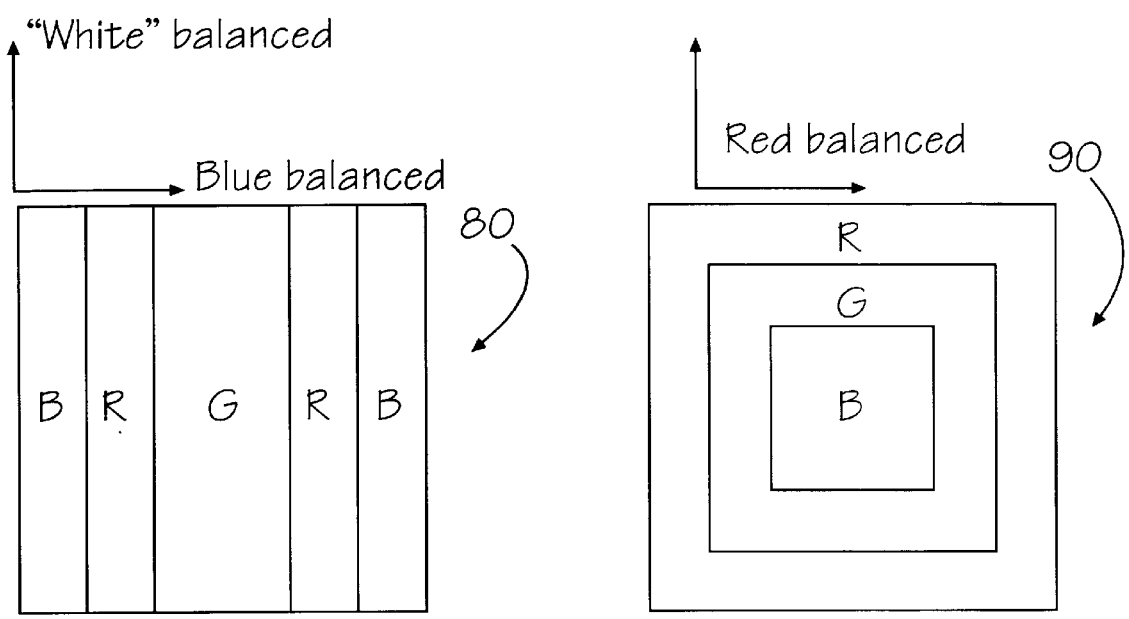

Referring to FIG. 5e, an example of a pixel layout design 80 is shown, for which a blue and white balance is achieved.

Figure 5F:
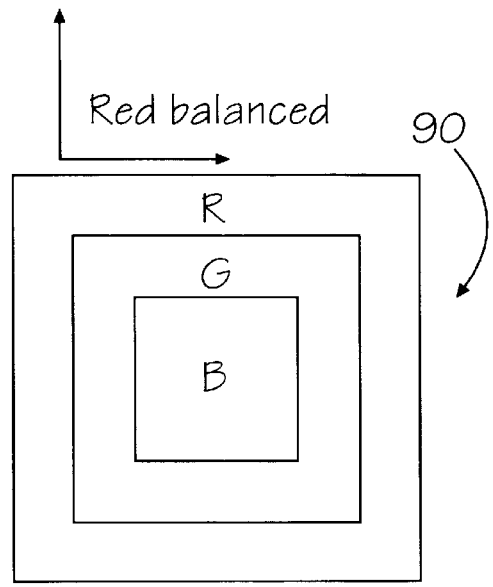

Referring to FIG. 5f, an example of a pixel layout design 90 is shown that provides a red balancing.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tiled, flat-panel, liquid crystal display having visually imperceptible seams, comprising: a plurality of individual display tiles having seams therebetween, said individual display tiles comprising pixels, each of said pixels comprising sub-pixel elements associated with each of three primary colors, and wherein said sub-pixel elements are sized and geometrically shaped to compensate for mask misregistration thereby improving the color purity of light from said display when a mask is misregistered relative to said sub-pixel elements thereby substantially eliminating color shifts arising from tile-to-mask registration errors, said color shifts being gradual color shifts within said individual display tiles or abrupt color shifts proximate said seams.

2. The tiled, flat-panel, liquid crystal display having visually imperceptible seams as recited in claim 1 wherein said sub-pixel elements comprise red, green and blue sub-pixel elements.

3. The tiled, flat-panel, liquid crystal display having visually imperceptible seams as recited in claim 1, wherein said sub-pixel elements are sized, shaped, or geometrically arranged to transmit a uniform spectral output when substantially equal sub-pixel drive signals are applied thereto.

4. The tiled, flat-panel, liquid crystal display having visually imperceptible seams as recited in claim 3, wherein said sub-pixel elements provide said display with an improved color gamut.

5. The tiled, flat-panel, liquid crystal display having visually imperceptible seams as recited in claim 3, wherein said sub-pixel elements transmit a substantially ideal, predetermined spectral output.

6. The tiled, flat-panel, liquid crystal display having visually imperceptible seams as recited in claim 5, wherein said predetermined, ideal spectral output comprises substantially white light.

7. The tiled, flat-panel, liquid crystal display having visually imperceptible seams as recited in claim 5, wherein sub-pixel elements associated with a first one of said primary colors are sized and geometrically shaped differently from sub-pixel elements associated with at least one of said other primary colors so as to adjust said spectral output of said display to a substantially ideal, predetermined spectral output.

8. The tiled, flat-panel, liquid crystal display having visually imperceptible seams as recited in claim 7, wherein said first primary color is blue and said other primary color is green.

9. The tiled, flat-panel, liquid crystal display having visually imperceptible seams as recited in claim 7, wherein said blue sub-pixel element is larger than said green sub-pixel element.

10. A tiled, flat-panel, liquid crystal display having visually imperceptible seams comprising:
   a) at least two display tiles located adjacent one another, each comprising a plurality of pixels, each pixel comprising sub-pixel elements associated with primary colors and wherein at least some of said sub-pixel elements are substantially rectangular with a vertical dimension greater than a horizontal dimension; and
   b) at least one mask disposed proximate said plurality of pixels and having apertures substantially aligned with said substantially rectangular sub-pixel elements;
   whereby said sub-pixels are arranged, shaped, or sized to compensate for mask misregistration such that said a mask may be misregistered relative to said sub-pixel elements without substantially changing the color balance of the light output of said display.

11. The tiled, flat-panel, liquid crystal display having visually imperceptible seams as recited in claim 10, wherein said sub-pixel elements of all of said pixels are arranged symmetrically relative to a centerline disposed along at least one of two perpendicular major axes of said pixels.

12. A tiled, flat-panel, liquid crystal display having visually imperceptible seams comprising:
   a) at least two display tiles located adjacent one another, each comprising a plurality of pixels, each pixel comprising sub-pixels arranged in a predetermined sub-pixel geometry; and
   b) an optical component proximate to and in a predetermined registration with said pixels;
   whereby said sub-pixels are arranged, shaped, or sized to compensate for misregistration of said optical component such that upon misregistration of said optical component along one or both of a vertical and a horizontal axis, light from said pixels maintains a predetermined spectral output.

13. The tiled, flat-panel, liquid crystal display having visually imperceptible seams as recited in claim 12, wherein said optical component selectively affects light transmitted through said pixels.

14. The tiled, flat-panel, liquid crystal display having visually imperceptible seams as recited in claim 13, wherein said optical component comprises at least one from the group of: masks, filters, shader plates and collimators.

15. The tiled, flat-panel, liquid crystal display having visually imperceptible seams as recited in claim 12, wherein said sub-pixel elements of all said pixels are arranged symmetrically relative to a centerline disposed along one of two perpendicular major axes of said pixels.

16. The tiled, flat-panel, liquid crystal display having visually imperceptible seams as recited in claim 12, wherein said pixel geometry comprises four corner regions, two of said corner regions being diagonally disposed and comprising sub-pixel elements of a first primary color: the remaining two of said corner regions also being diagonally disposed and comprising sub-pixel elements of a second primary color: a separating region disposed between said corner regions comprising a sub-pixel element of a third primary color.

17. The tiled, flat-panel, liquid crystal display having visually imperceptible seams as recited in claim 12, wherein said pixel geometry comprises three concentric, rectangular rings, each of said rings comprising a sub-pixel element of a different primary color.

18. The tiled, flat-panel, liquid crystal display having visually imperceptible seams as recited in claim 12, wherein said pixel geometry comprises a central, rectangular region comprising a sub-pixel element of a first primary color: smaller rectangular regions disposed adjacent each side of said central region, said smaller rectangular regions comprising sub-pixel elements of a second primary color: additional rectangular regions disposed adjacent each of said smaller rectangular regions, said additional rectangular regions comprising sub-pixel elements of a third primary color.

* * * * *